United States Patent [19]

Kleist et al.

[11] 3,715,738

[45] Feb. 6, 1973

[54] DATA DETECTION SYSTEM

[75] Inventors: Robert A. Kleist; Robert L. Thorne, both of Anaheim, Calif.

[73] Assignee: Peripheral Business Equipment, Inc.

[22] Filed: Oct. 19, 1970

[21] Appl. No.: 81,989

[52] U.S. Cl. ..............340/174.1 H, 328/114, 328/117

[51] Int. Cl. ..............G11b 5/02

[58] Field of Search .........328/114, 117; 340/174.1 H

[56] References Cited

UNITED STATES PATENTS 3,413,625 11/1968 Mitterer et al................340/174.1 H

*Primary Examiner*—J. Russell Goudeau

[57] ABSTRACT

A data detection system is disclosed in which digital data bits represented by flux transitions on a magnetic medium produce peaks in a signal sensed by a magnetic read head as the magnetic medium moves relative to the read head. The sensed signal is passed to a peak pulser where the signal is differentiated and thereafter compared with positive and negative threshold levels to produce a data pulse corresponding to each peak of the sensed signal. The sensed signal is also passed to a clipping level detector where it is compared with positive and negative clipping levels to produce a gating pulse when the clipping levels are exceeded. The gating pulses are employed to selectively gate the data pulses to an output as the detected data.

9 Claims, 10 Drawing Figures

*INVENTORS*
ROBERT A. KLEIST
ROBERT L. THORNE

*INVENTORS*
ROBERT A. KLEIST
ROBERT L. THORNE

DATA DETECTION SYSTEM

BACKGROUND OF THE INVENTION

1. Field of the Invention

The present invention relates to data detection systems, and more particularly to detection systems of the type in which a magnetic recording is sensed so as to provide a signal in which peaks corresponding to flux transitions on the magnetic recording medium are separated and identified as data bits.

2. History of the Prior Art

A variety of techniques are available for detecting data which is in digitally encoded form. The particular technique used depends on a number of factors including the type of encoding employed. NRZI, frequency encoding and phase encoding, for example, denote data by the presense or absence of a transition of the data signal at the center of each bit cell.

one technique commonly employed to detect data bits as represented by transitions of a data signal employs full wave rectification, clipping and peak detection. The data signal which may comprise a magnetic recording or other appropriate medium for presenting such signal to be detected is sensed, such as by use of a magnetic read head in the case of a magnetic recording, to provide a sensed signal with peaks corresponding to the transitions of the data signal. The sensed signal is applied to a full wave rectifier both directly and through a linear inverter. The rectifier rectifies both the sensed signal and its complement so as to provide to a clipping circuit a series of unidirectional pulses corresponding to the various bidirectional pulses which comprise the sensed signal. The clipping circuit provides at the output thereof that portion of each input pulse which exceeds the clipping level. The clipping circuit serves to accept those pulses which correspond to valid data bits and to reject noise and other unwanted pulses which are typically of lesser amplitude than the data bit produced pulses and therefore entirely below the clipping level. The output of the clipping circuit is applied to a peak detector which provides a digital output transition corresponding in time to the peak of each pulse at the output of the clipping circuits.

Data detection systems of this type typically suffer from a number of disadvantages, not the least of which are high component cost and susceptibility to drift and noise. The linear inverter is an active inverter usually comprising a high open loop gain inverting amplifier with a closely regulated closed loop gain of unity. Costly precision components are typically required in this circuit if the gain is to be maintained substantially equal to unity. The full wave rectifier typically comprises a pair of diodes respectively coupling the sensed signal and the output of the linear inverter to the clipping circuit. Such diodes have inherently variable conducting characteristics which contribute to uncertainty in determining the exact clipping level. The signal thus derived for application to the peak detector can vary widely in amplitude from full level signals down to extremely small signals which just barely exceed the clipping level. The peak detector may include a capacitive differentiator to produce a charging current which reverses direction at each peak of the input voltage thereto. Such current reversals are amplified and used to drive an output amplifier which produces a digital output signal corresponding in time to the peak of the voltage waveform applied to the capacitive differentiator. Peak detectors of this type are essentially active differentiators, and such circuits have a high inherent susceptibility to noise.

Accordingly, an object of the present invention is to provide an improved data detection system.

A further object of the present invention is to provide a data detection system of reduced cost.

A further object of the present invention is to provide a data detection system of increased accuracy and reliability.

A further and more specific object of the present invention is to provide a data detection system of greatly reduced susceptibility to drift and noise.

BRIEF DESCRIPTION OF THE INVENTION

Data detection systems according to the present invention employ a peak pulser which is responsive to a sensed signal as derived from the data signal such as by means of a magnetic read head to provide a data pulse in time coincidence with each peak of the sensed signal. The sensed signal is also applied to a clipping level detector where it is compared with a predetermined value so as to provide a gating pulse each time the sensed signal exceeds the predetermined value. The data pulses from the peak pulser are then selectively passed to an output as detected data bits under the control of the gating pulses from the clipping level detector.

As noted the peak pulser serves to provide a data pulse in response to each peak of the sensed signal. Such pulses include valid data pulses produced in response to peaks of the sensed signal which correspond to transitions of the data signal. Such pulses also include invalid or erroneous data pulses derived from the peaks of noise or other unwanted signals within the sensed signal. The gating pulses from the clipping level detector effectively comprise a window that gates those data pulses which are derived from peaks which exceed the predetermined value to the exclusion of peaks which are less than the predetermined value. Peaks of the sensed signal which are produced by transitions of the data signal normally exceed the predetermined value while the peaks of noise and other unwanted signals are normally less than the predetermined value. In this way valid data bits are selectively gated to the output to the exclusion of invalid or noise produced data bits.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION

Figure 1:
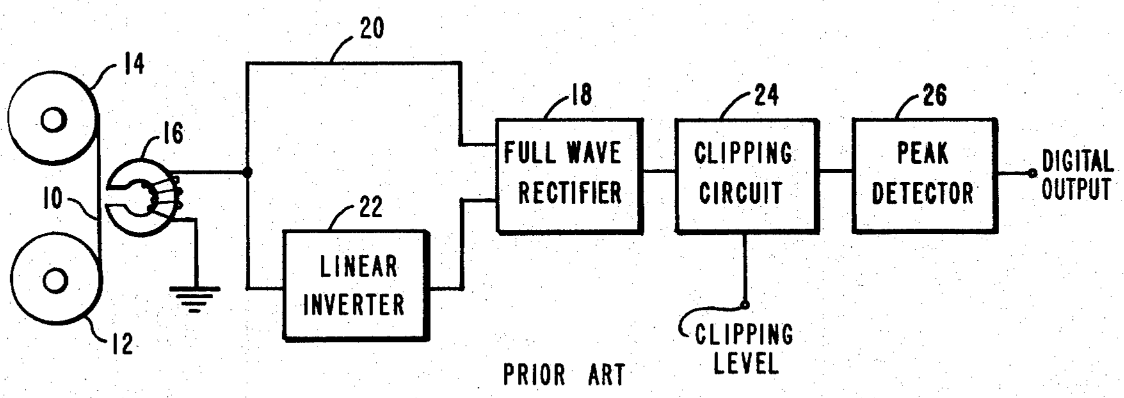
FIG. 1 is a block diagram of a prior art data detection system.

One typical prior art data detection system which involves problems of the type greatly reduced or eliminated by the present invention is illustrated in block diagram form in FIG. 1. In the FIG. 1 arrangement, as illustrated, the data signal which includes valid data bits to be detected comprises a magnetic recording on a tape 10 which extends between supply and takeup reels 12 and 14. It should be understood that the data signal is illustrated in FIG. 1 and hereafter in FIG. 2 as comprising a magnetic recording for purposes of example only, and that other arrangements for providing the data signal, both magnetic and non-magnetic, may be used. For example, the data signal may comprise a magnetic recording on a disk, drum or strip instead of the tape 10 shown, or alternatively may comprise a signal transmitted over a communication channel.

In the case where the data signal comprises a magnetic recording, a magnetic read head 16 is employed to sense the magnetic recoding and thereby provide a sensed signal which is a differentiation of the recording. Zero crossings or flux transitions of the magnetic recording which represent data bits are translated into peaks of the sensed signal by the read head 16. In cases where a magnetic recording is not used such as where the data signal is transmitted over a communication channel, a differentiator may be employed to provide the sensed signal having peaks corresponding to the transitions of the data signal.

The sensed signal derived at the read head 16 may be amplified by a linear amplifier (not shown) where desired prior to being applied to a full wave rectifier 18 both directly via a lead 20 and via a linear inverter 22. The linear inverter 22 typically comprises a high open loop gain inverting amplifier having a closely regulated closed loop gain of unity. The full wave rectifier 18 typically comprises a pair of diodes, of which couples the sensed signal at the lead 20 to a clipping circuit 24 and the other of which couples the sensed signal as inverted by the linear inverter 22 to the clipping circuit 24. The diodes comprising the rectifier 18 are arranged to pass pulses of one direction or sense only to the clipping circuit 24. Accordingly by inverting the true value of the sensed signal to provide its complement and thereafter rectifying both the true and complementary values of the sensed signal, a series of unidirectional pulses is provided to the clipping circuit 24, each of the pulses corresponding to a pulse of the sensed signal.

The clipping circuit 24 produces an output only when the output signal thereto exceeds the magnitude of an externally set clipping level signal. The purpose of this circuit is to insure that any unwanted signals below the selected clip level are rejected. The clipping circuit 24 typically includes a junction at the input thereof which is coupled both to the output and via a resistor to the externally set clipping level signal. The input signal to the clipping circuit 24 from the rectifier 18 is disconnected from the output due to back-biasing of the diodes of the rectifier 18 until such time as the voltage of the input signal equals the clipping level signal. For input voltages which exceed the clipping level signal, a voltage equal to the difference between the input voltage and the clipping level signal voltage appears at the output of the clipping circuit 24. In this way the peaks of those pulses at the output of the full wave rectifier 18 which exceed the clipping level of the clipping circuit 24 are applied to a peak detector 26. The peak detector 26 provides a digital output transition corresponding in time to each peak of the sensed signal as passed by the clipping circuit 24. The peak detector 26 typically includes a capacitive differentiator for producing a charging current which reverses direction upon the occurrence of each peak of the input voltage. Each such current reversal is amplified and used to drive an output amplifier which produces a digital output signal corresponding in time to each peak of the voltage waveform applied to the capacitive differentiator by the clipping circuit 24. The signals at the output of the peak detector 26 comprise the desired digital output which may then be processed in a digital manner to recover the information carried by the magnetic recording on the tape 10.

As previously noted data detection systems of the type illustrated in FIG. 1 involve a number of inherent disadvantages or problems which may severely limit their applicability or usefulness. The linear inverter 22 is an active inverter which requires precision components if the internal gain thereof is to be maintained substantially at unity, thereby increasing considerably the cost of the data detection system. Moreover, the diodes comprising the full wave rectifier 18 have inherently variable conducting characteristics which contribute to considerable uncertainty in determining the exact clipping level at the clipping circuit 24. Thus as the conducting characteristics of one or both such diodes vary, the current into the clipping circuit 24 for a given voltage of the sensed signal or its complement varies resulting in variations in the input voltage to the clipping circuit 24. The practical result is a drifting in the effective clipping level for a given input voltage. As the effective clipping level varies, the clipping of the output pulses from the rectifier 18 becomes non-uniform and may eventually vary sufficiently so as to either block valid data pulses of minimum amplitude from the output of the clipping circuit 24 or pass unwanted noise pulses of relatively large amplitude to the output of the clipping circuit 24. Furthermore, the peak detector 26 is essentially an active differentiator, and as such has a high inherent susceptibility to noise.

Figure 2:
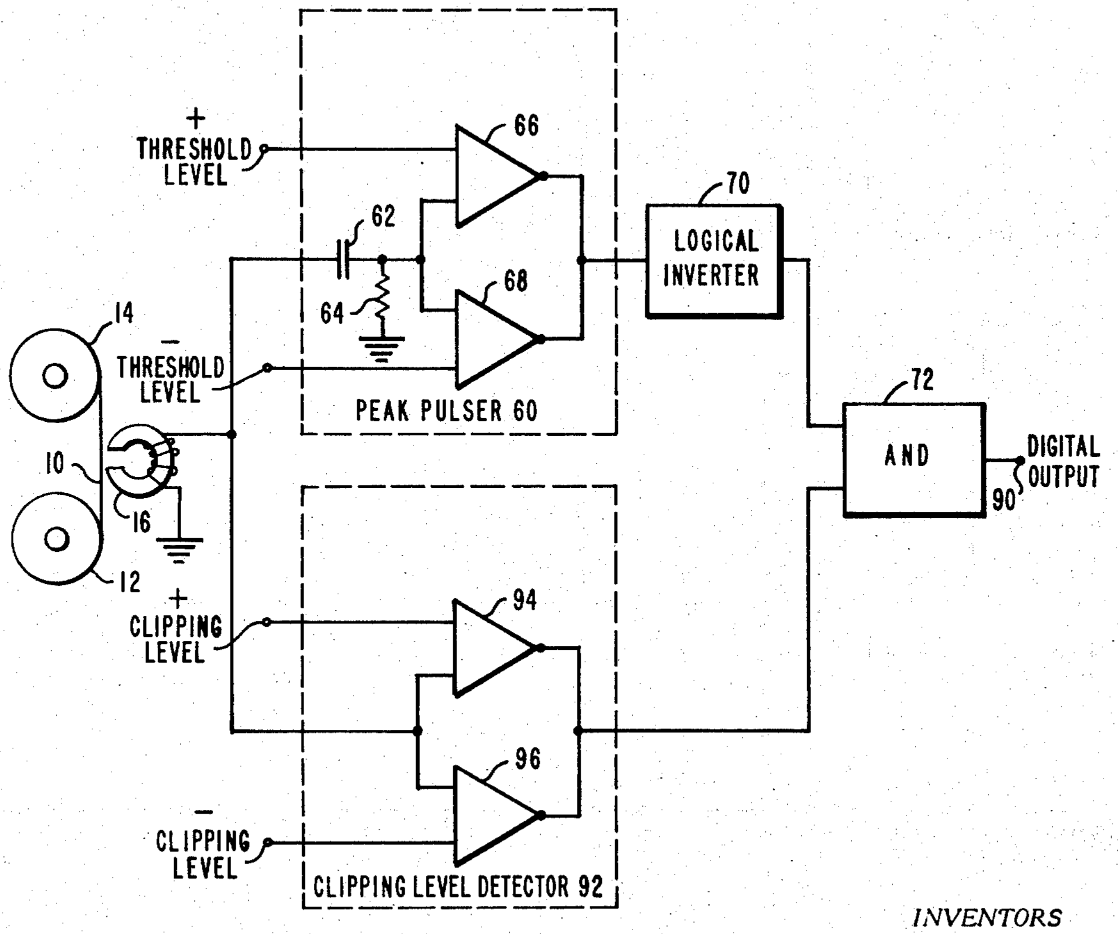
FIG. 2 is a block diagram of one preferred arrangement of a data detection system according to the present invention.
Figure 3:
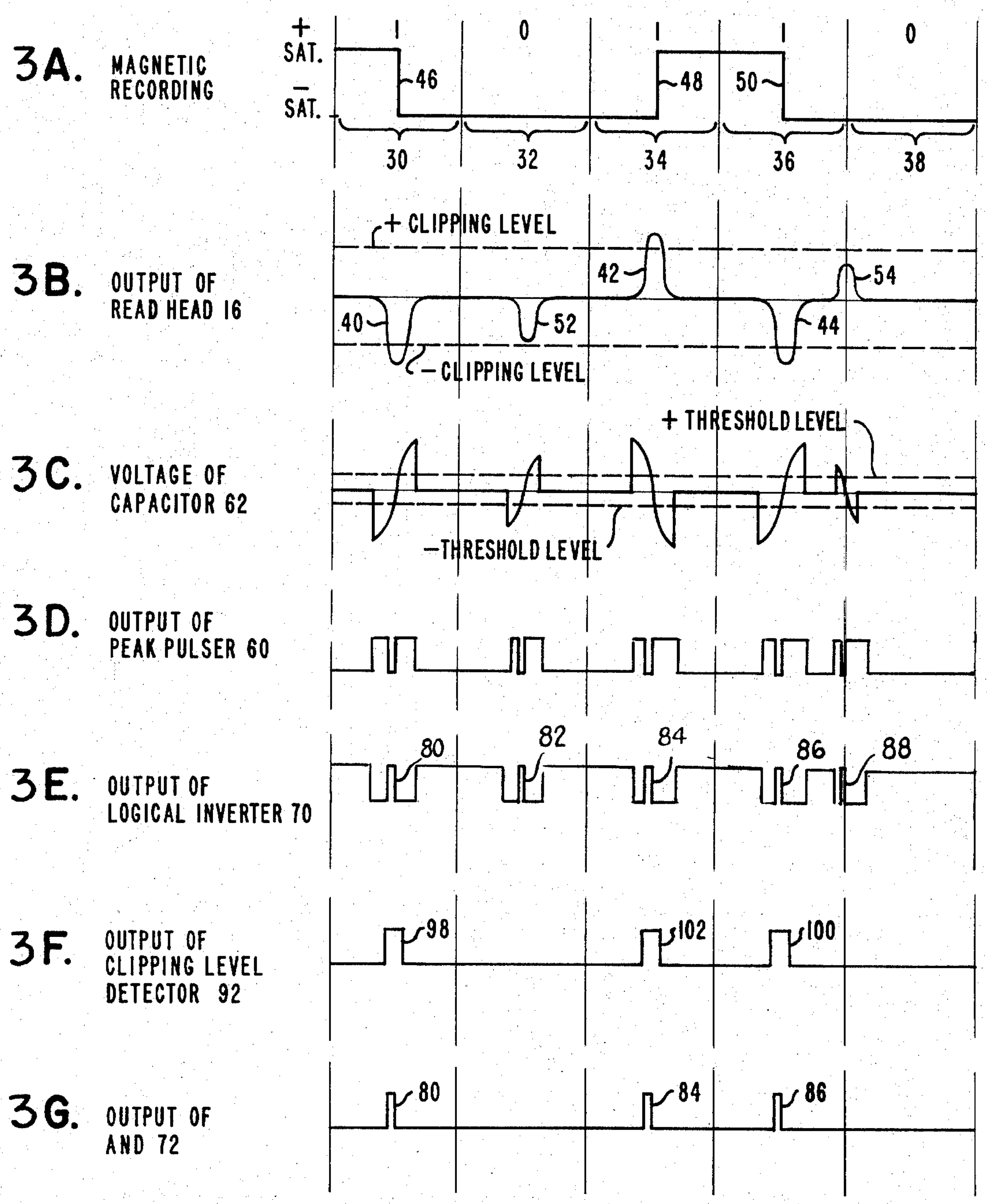
FIGS. 3A–3G are waveforms useful in explaining the operation of the arrangement of FIG. 2.

One preferred arrangement of a data detection system according to the present invention which substantially minimizes or eliminates a number of the problems inherent to detection systems of the type illustrated in FIG. 1 is illustrated in FIG. 2. In the arrangement of FIG. 2 the magnetic tape 10, the supply and takeup reels 12 and 14 and the magnetic read head 16 are again illustrated as providing the data signal and signal which is sensed therefrom, although it will be appreciated by those skilled in the art that other means of presenting the data signal can also be used according to the invention. The magnetic recording on the tape 10 which comprises the data signal is shown in FIG. 3A for purposes of illustration only as comprising an NRZI format in which flux transitions between opposite states of magnetic saturation represent data bits or "ones." The length of the magnetic recording is arbitrarily divided into a succession of bit cells or bit intervals, with five of such bit intervals 30, 32, 34, 36 and 38 being illustrated in FIG. 3A. The bit intervals 30, 34 and 36 which represent binary one include a transition at the approximate centers thereof, while the bit intervals 32 and 38 which represent binary zero are absent a transition. It should be understood that the NRZI format or encoding of FIG. 3A is illustrated by way of example only and that other encoding schemes can be employed in accordance with the invention.

The read head 16 responds to motion of the magnetic tape 10 relative thereto to differentiate the magnetic recording and provide at its output a sensed signal as shown in FIG. 3B. The sensed signal of FIG. 3B, which is shown in greatly simplified fashion for purposes of the present discussion, comprises a plurality of pulses 40, 42 and 44 the peaks of which generally coincide in time with transitions 46, 48 and 50 of the data signal of FIG. 3A. The sensed signal of FIG. 3B also typically includes a number of waveform variations such as pulses which result from noise and other undesirable phenomena, two such noise pulses 52 and 54 being illustrated in FIG. 3B. The noise pulses are typically of lesser amplitude than the data bit produced pulses 40, 42 and 44. The particular noise pulse 52 is illustrated as being of relatively large amplitude and occurring approximately at the center of the bit interval 32, while the noise pulse 54 is illustrated as being of somewhat lesser amplitude and occurring approximately at the trailing edge of the bit interval 36 and the leading edge of the bit interval 38.

Noise pulses and other unwanted signals are fairly common and can occur as a result of a number of different magnetic or electrical phenomena. For example, the non-magnetic gap in the read head 16 occasionally produces a secondary pulse or peak adjacent to and of lesser amplitude than the primary data signal transition produced pulse. The secondary or noise peak may be erroneously detected as a valid data bit if means for rejecting peaks of this type are not provided.

Data detection systems according to the present invention eliminate the undesirable linear inversion and rectification required in prior art systems of the type illustrated in FIG. 1 and provide a simpler and more accurate means of digitally reconstituting the encoded information. In systems according to the invention, a data pulse is generated in response to each peak of the sensed signal from the read head 16, and the resulting data pulses are selectively gated to an output under the control of gating pulses. The gating pulses are derived from the sensed signal by comparing the sensed signal with a predetermined value so as to generate a gating pulse whenever the sensed signal amplitude exceeds the predetermined value.

As shown in FIG. 2 the data pulses are generated by a peak pulser 60 which includes a capacitive differentiator circuit in the form of a capacitor 62 and resistor 64 serially coupled between the output of the read head 16 and ground. The capacitive differentiator circuit 62, 64 produces a signal whose value is proportional to the slope of the input signal thereto. In the present example, the capacitive differentiator circuit 62, 64 differentiates the sensed signal from the read head 16, the capacitor 62 experiencing a reversal of current therethrough in coincidence with each peak of the sensed signal. FIG. 3C illustrates the differentiated signal provided by the voltage at the capacitor side of the resistor 64. This voltage is compared with a positive threshold level signal by a comparator 66 and with a negative threshold level signal by a comparator 68. The positive and negative threshold levels are illustrated as dashed lines superimposed on the waveform of FIG. 3C. The resulting output of the peak pulser 60 is illustrated in FIG. 3D. The comparators 66 and 68 cause the output of the peak pulser 60 to remain high except when the voltage at the capacitor side of the resistor 64 lies within the relatively narrow region between the positive and negative threshold level as shown in FIG. 3D. Thus, when the differentiated signal is more positive than the positive threshold level or more negative than the negative threshold level, the output of the peak pulser 60 is high. Similarly, when the differentiated signal is less positive than the positive threshold level and less negative than the negative threshold level, the output of the peak pulser 60 is low.

The time constant of the capacitive differentiator circuit 62, 64 and the threshold levels are normally adjusted to produce a relatively short zero crossing time, thereby creating a narrow output signal whose width, as shown in FIG. 3D, is proportional to the length of time required for the input signal to traverse the two comparison levels. Any displacement of the narrow output signal from the corresponding peak of the sensed signal is a function of the phase shift introduced by the capacitive differentiator circuit 62, 64, and can be made very small due to the high gain of the associated comparators.

The output of the peak pulser 60 is inverted by a logical inverter 70 to provide to one input of an AND circuit 72 a signal as shown in FIG. 3E comprising a plurality of data pulses 80, 82, 84, 86 and 88. The data pulses 80, 84 and 86 are valid data pulses in that they represent or correspond to the pulses 40, 42 and 44 of the sensed signal of FIG. 3B and the related transitions 46, 48 and 50 of the data signal of FIG. 3A. The data pulses 82 and 88 are false and therefore unwanted pulses in that they correspond to the noise pulses 52 and 54 of the sensed signal of FIG. 3B.

The valid data pulses 80, 84 and 86 are gated by the AND circuit 72 to an output 90 to the exclusion of the unwanted or invalid data pulses 82 and 88 under the control of gating pulses provided to a second input of the AND circuit 72 by a clipping level detector 92. The sensed signal at the output of the read head 16 as shown in FIG. 3B is compared with a positive clipping level by a comparator 94 and with a negative clipping level by a comparator 96. The positive and negative clipping levels are shown as dashed lines superimposed on the waveform diagram of FIG. 3B, and the resulting output in the form of gating pulses from the clipping level detector 92 is shown in FIG. 3F. The bilevel output of the clipping level detector 92 is normally at the lower of two levels and is raised to the upper of the two levels to produce a gating pulse whenever the amplitude of the sensed signal is more positive than the positive clipping level as determined by the comparator 94 or more negative than the negative clipping level as determined by the comparator 96. Thus, as shown in FIG. 3F the comparator 96 raises the output of the clipping level detector 92 to the higher level to produce a gating pulse 98 during that time when the pulse 40 occurring during the first bit interval 30 as shown in FIG. 3B is more negative than the negative clipping level.

The comparator 96 responds in similar fashion to the negative pulse 44 of the sensed signal of FIG. 3B within the bit interval 36 to produce a gating pulse 100. Within the third bit interval 34 the comparator 94 raises the output of the clipping level detector 92 to the higher level during the time that the amplitude of the pulse 42 shown in FIG. 3B exceeds or is more positive than the positive clipping level to produce the gating pulse 102 shown in FIG. 3F. Since the pulse 52 shown in FIG. 3B is a noise pulse having a peak amplitude which is less negative than the negative clipping level, the output of the clipping level detector 92 remains at the lower level and no gating pulse is provided. Similarly, the noise pulse 54 shown in FIG. 3B has a peak amplitude less positive than the positive clipping level so that no gating pulse results.

It will be seen that the clipping level detector 92 provides the proper clipping action of the sensed signal from the read head 16 even though the sensed signal has not been full wave rectified as in the case of the conventional system of FIG. 1.

The gating pulses provided by the clipping level detector 92 as shown in FIG. 3F selectively enable the AND circuit 72 to pass the data pulses 80, 84 and 86 to the output 90 to the exclusion of the unwanted or noise generated data pulses 82 and 88. The resulting output of the AND circuit 72 is shown in FIG. 3G. The gating pulses provided by the clipping level detector 92 thus function as a window in which data pulses derived from sensed signal pulses of maximum amplitude greater than the predetermined value defined by the positive and negative clipping levels are located and identified as valid data bits to the exclusion of those data pulses corresponding to sensed signal pulses having a peak amplitude less than the predetermined value.

The data detection system shown in FIG. 2 avoids many of the disadvantages associated with prior art systems of the type shown in FIG. 1, and where desired may be fabricated primarily of low cost integrated circuits which are readily available commercially. The pairs of comparators 66, 68 and 94, 96, for example, may comprise integrated circuit dual comparators which are high gain, high speed, high accuracy devices capable of producing a digital output for differential input voltages on the order of 4 millivolts or less. The logical inverter 70 and AND circuit 72 may comprise any appropriate commercially available circuits of integrated or other design.

While the invention has been particularly shown and described with reference to a preferred embodiment thereof, it will be understood by those skilled in the art that various changes in form and details may be made therein without departing from the spirit and scope of the invention.

What is claimed is:

1. For use in an arrangement in which the data carried by a data signal is detected by selectively gating pulses corresponding to the peaks of the data signal to an output under the control of a gating signal, a circuit for generating the pulses corresponding to the peaks of the data signal comprising means responsive to the data signal for differentiating the data signal and pulse generating means including means responsive to the differentiated data signal for initiating the generation of a pulse whenever the differentiated data signal becomes less positive than a predetermined positive threshold level and less negative than a predetermined negative threshold level and means responsive to the differentiated data signal for terminating the generation of the pulse whenever the differentiated data signal becomes more positive than the predetermined positive threshold level or more negative than the predetermined negative threshold level.

2. An arrangement for detecting data carried by an information bearing signal of varying waveform comprising:

means responsive to the information bearing signal for generating a data pulse in response to each peak of the information bearing signal waveform, said means including means responsive to the information bearing signal for differentiating the information bearing signal, and means responsive to the differentiated information bearing signal for generating a data pulse whenever the differentiated information bearing signal is less positive than a predetermined positive threshold level and less negative than a predetermined negative threshold level, said means for generating a data pulse being operative to prohibit the generation of a data pulse whenever the differentiated information bearing signal is more positive than the predetermined positive threshold level or more negative than the predetermined negative threshold level;

means responsive to the information bearing signal for generating a gating pulse whenever the information bearing signal waveform exceeds a predetermined clipping level; and means responsive to the data and gating pulses for selectively gating the data pulses to an output under the control of the gating pulses.

3. An arrangement for detecting data carried by an information bearing signal of varying waveform comprising:

means responsive to the information bearing signal for generating a data pulse in response to each peak of the information bearing signal waveform, said means including means responsive to the information bearing signal for differentiating the information bearing signal and means responsive to the differentiated information bearing signal for generating a data pulse only when the differentiated information bearing signal is less positive than a predetermined positive threshold level and less negative than a predetermined negative threshold level;

means responsive to the information bearing signal for generating a gating pulse whenever the information bearing signal waveform exceeds a predetermined clipping level; and means responsive to the data and gating pulses for selectively gating the data pulses to an output under the control of the gating pulses.

4. An arrangement in accordance with claim 3, wherein the means for generating a gating pulse includes first comparator means responsive to the information bearing signal for generating a gating pulse whenever the information bearing signal waveform is more positive than a predetermined positive clipping level, and second comparator means responsive to the information bearing signal for generating a gating pulse whenever the information bearing signal waveform is more negative than a predetermined negative clipping level.

5. An arrangement in accordance with claim 3, further including means responsive to the data pulses for inverting the data pulses, and wherein the selective gating means comprises AND gate means having one input coupled to receive the inverted data pulses and another input coupled to receive the gating pulses.

6. An arrangement for detecting data bits represented by transitions of a magnetic recording comprising the combination of:

read head means disposed adjacent the magnetic recording and responsive to movement of the magnetic recording relative thereto to provide a sensed signal of variable waveform having peaks corresponding to transitions of the magnetic recording;

means responsive to the sensed signal for generating a data signal indication in response to each peak of the sensed signal waveform and including means for differentiating the sensed signal waveform, first comparator means for generating a data signal indication only whenever the differentiated sensed signal waveform has a value between a positive threshold level and zero, and second comparator means for generating a data signal indication only whenever the differentiated sensed signal waveform has a value between a negative threshold level and zero; and means responsive to the sensed signal and to the data signal indications for selectively passing the data signal indications to an output whenever the sensed signal exceeds a predetermined level.

7. An arrangement in accordance with claim 6 wherein the means for selectively passing includes bilevel signal generating means for providing a first signal level whenever the sensed signal is less than the predetermined level and a second signal level whenever the sensed signal is greater than the predetermined level.

8. An arrangement in accordance with claim 7, wherein the bilevel signal generating means includes third comparator means responsive to the sensed signal for providing the second signal level whenever the sensed signal is more positive than a positive clipping level and fourth comparator means responsive to the sensed signal for providing the second signal level whenever the sensed signal is more negative than a negative clipping level.

9. An arrangement in accordance with claim 8, wherein the differentiating means includes capacitive means coupled to be charged and discharged by the sensed signal and resistive means coupled to the capacitive means for providing a voltage representing the level of charge of the capacitive means.

* * * * *